(12) United States Patent
Upton

(10) Patent No.: US 8,282,687 B2
(45) Date of Patent: Oct. 9, 2012

(54) SECURITY LOCKING APPARATUS AND METHOD FOR PORTABLE COMPUTER

(75) Inventor: John Daniel Upton, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 1170 days.

(21) Appl. No.: 12/127,504

(22) Filed: May 27, 2008

(65) Prior Publication Data

US 2008/0229434 A1 Sep. 18, 2008

Related U.S. Application Data

(63) Continuation of application No. 11/168,724, filed on Jun. 28, 2005, now abandoned.

(51) Int. Cl.
*G06F 21/00* (2006.01)
(52) U.S. Cl. .......................................................... 726/35
(58) Field of Classification Search ........................ None
See application file for complete search history.

(56) References Cited

U.S. PATENT DOCUMENTS

| | | |
|---|---|---|
| 4,447,885 A | 5/1984 | Biss |
| 4,512,428 A | 4/1985 | Bullivant |
| 4,682,228 A | 7/1987 | Ando et al. |
| 6,005,487 A | 12/1999 | Hyatt, Jr. et al. |
| 6,137,409 A | 10/2000 | Stephens |
| 6,151,218 A * | 11/2000 | Pirdy et al. ............. 361/727 |
| 6,271,604 B1 | 8/2001 | Frank, Jr. et al. |
| 6,297,963 B1 * | 10/2001 | Fogle .................... 361/747 |
| 6,307,738 B1 | 10/2001 | Tran et al. |
| 6,513,350 B1 | 2/2003 | Hurd et al. |
| 7,130,188 B2 * | 10/2006 | Lee ..................... 361/679.57 |
| 2004/0123161 A1 * | 6/2004 | Harada et al. ............ 713/202 |
| 2006/0107073 A1 * | 5/2006 | Lane et al. .............. 713/194 |
| 2006/0294586 A1 | 12/2006 | Upton |

OTHER PUBLICATIONS

USPTO Non-final office action dated Nov. 20, 2008 regarding U.S. Appl. No. 11/168,724.

* cited by examiner

*Primary Examiner* — Minh Dinh
(74) *Attorney, Agent, or Firm* — Yee & Associates, P.C.

(57) ABSTRACT

A security apparatus and method is provided for a portable computer, wherein a solenoid within the portable computer is controlled by a specified program running on the computer. Activation of the solenoid is usefully enabled by a password or computer security chip. One embodiment, comprising a security apparatus, includes a locking mechanism such as a conventional manually operated USS locking device having a locking element. The security apparatus further includes a component positioned proximate to a slot disposed to receive the locking element, the component being adjustable to vary a dimension of the slot entrance between hold and release modes. The component is coupled to the solenoid and is actuated to adjust the slot entrance dimension, from the hold mode to the release mode, when the solenoid is energized in response to a command generated by the specified program running on the computer.

20 Claims, 8 Drawing Sheets

SECURITY LOCKING APPARATUS AND METHOD FOR PORTABLE COMPUTER

This application is a continuation of application number Ser. No. 11/168,724, filed Jun. 28, 2005, status abandoned.

BACKGROUND OF THE INVENTION

1. Field of the Invention

The invention disclosed and claimed herein generally pertains to a security locking apparatus and method for portable computers, wherein the invention provides enhanced adaptability. More particularly, the invention pertains to apparatus of the above type wherein a portable computer that is locked in place may be released by a program running on the computer. Even more particularly, the invention pertains to apparatus of the above type wherein a locked portable computer can be released either by a program running on the computer, or by manually unlocking a conventional security lock.

2. Description of the Related Art

Laptop computers, notebook computers and other portable computer devices typically have high monetary value, often on the order of $1,000 or more. At the same time, portable computers are intentionally designed to be as mobile as possible, to enable users to easily move them from one location to another. Accordingly, it has been necessary to develop security locking systems for portable computers, to prevent their theft or other unauthorized removal from a site of use.

In conventional locking systems of the above type, locks typically consist of a cable terminated in a standardized "Universal Security Slot" (USS) locking tab. Nearly all laptop computers and docking stations made today incorporate a USS compatible slot. Security locking devices and cables that can be used with a USS compatible slot are referred to herein as "USS locking devices". Such devices are available with either tamper-resistant keys or rotary combination locks.

A significant problem with USS locking devices is that they generally must be unlocked manually, in order to remove the computer from a current location. However, when the computer is used in and locked to a docking station or port replicator, there are often accessibility problems with unlocking the device for removal. For example, the portable computer may be positioned so that a keyhole or combination lock dial is awkward to reach, or is blocked by stationary adjacent structure.

Moreover, if quick removal is required, even readily accessible locations of a USS locking device generally will still require using a key or dialing in a combination to release the computer. Frequently, neither of these methods is particularly quick or easy.

SUMMARY OF THE INVENTION

The invention generally provides an apparatus and method wherein a solenoid within a portable computer or docking station is used in connection with a conventional USS, and the solenoid may be controlled by a program running on the computer. Such solenoid, in its non-energized state, provides a slot compatible for use with manual USS locking devices of the types currently available. When energized, the solenoid expands the width of the USS slot, such that even a locked cable may be removed therefrom. Activation of the solenoid may be controlled by a computer security chip, such as is currently built into many or most laptop computers. A useful embodiment of the invention is directed to a portable computer security apparatus. Such apparatus includes a locking mechanism having a user interface and a locking element, wherein the locking element is movable from a lock mode to an unlock mode in response to operation of the user interface. The security apparatus further includes a component joined to the portable computer proximate to a slot disposed to receive the locking element, the component being adjustable between locking element hold and release configurations. The received locking element is fixably retained in the slot only when the locking element is in the locked mode, and the component is in the hold configuration. The apparatus further comprises a device that is actuated to adjust the slot, from the hold configuration to the release configuration, in response to a command generated by a specified program running on the computer.

DETAILED DESCRIPTION OF THE PREFERRED EMBODIMENT

Figure 1:
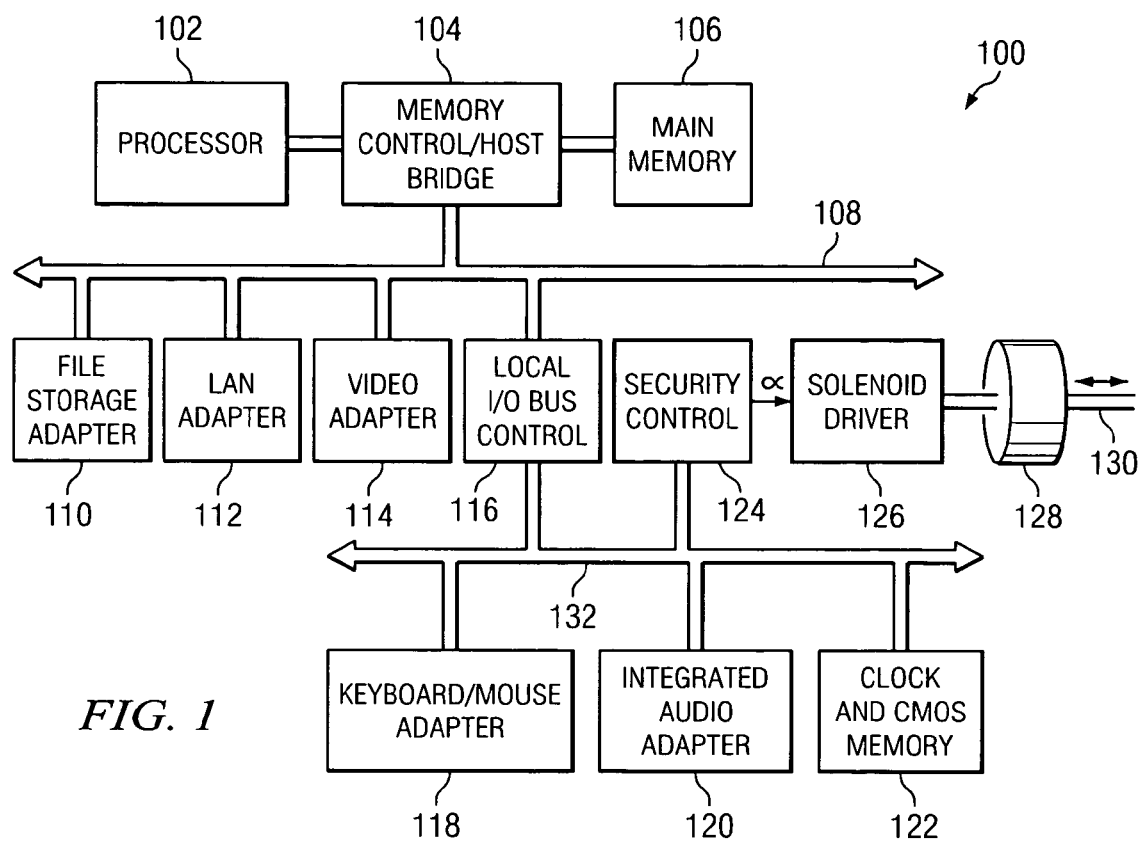
FIG. 1 is a block diagram showing a data processing system and solenoid that are contained in a portable computer and configured to implement an embodiment of the invention.

Referring to FIG. 1, there is shown a block diagram of a generalized data processing system 100, adapted for use in implementing an embodiment of the invention. System 100 exemplifies a data processing system that may be found in various types of portable computers, in which code or instructions for implementing the processes of the present invention may be located. The term "portable computer" is defined and used herein to mean any computer or data processing device that can be readily moved from one place to another, such as by a single user. Such term includes laptop computers, notebook and sub-notebook computers, hand-held computers, palmtops and personal digital assistants (PDA's), but is not limited to such devices.

Data processing system 100 usefully employs a peripheral component interconnect (PCI) local bus architecture. FIG. 1 shows a processor 102 and main memory 106 coupled through a host bridge 104 to a bus 108. Host bridge 104 also includes a memory controller for processor 102. FIG. 1 further shows bus 108 connected to a file storage adapter 110, a local area network (LAN) adapter 112 and a video adapter 114.

Referring further to FIG. 1, there is shown a local I/O bus control 116 likewise connected to bus 108. By means of a local bus 132, a keyboard mouse adapter 118, an integrated audio adapter 120 and a clock and CMOS memory 122 are respectively connected to I/O bus control 116, and therethrough to other components of data processing system 100.

A security control element 124, also connected to I/O bus control 116, is provided for use in implementing an embodiment of the invention, as described hereinafter in further detail. Security control 124 is coupled to operate a solenoid driver 126, which is provided to selectively energize and de-energize a solenoid 128 or other linear or rotary actuator device. Solenoid 128 is provided with a plunger 130 or like elongated element, constrained to move linearly in response to successive energizations and de-energizations of solenoid 128. Alternative embodiments may include a rotary solenoid provided with a rotational element which turns in response to successive energizations and de-energization of the solenoid.

Security control element 124 may include a biometric sensor or other security chip interfaces. Such devices are increasingly used to confirm that someone using or operating a computer is authorized to do so. A fingerprint access device would be one example of a biometric sensor that could be used in security control element 124. Such device scans the fingerprint of a prospective user, and compares the scan with authorized user fingerprints. Other types of security chips or biometric sensors could be used in connection with security control element 124.

In concert with the security chip or biometric sensor of security control 124, a software user interface program is installed on data processing system 100, for use in releasing a portable computer security lock. As described hereinafter in further detail, in connection with FIG. 2, this lock release program is configured to allow a user to select or define a password, and also to specify a time period. When the user enters the password into system 100 and the password is verified, a signal is sent to security control 124. If the user has also been confirmed or positively identified by the security chip, security control 124 would be operated to send an energization signal α to the solenoid driver 126. Driver 126 would then supply power to energize solenoid 128, whereupon plunger 130 would be moved linearly or rotationally. The solenoid would remain energized for the time period specified by the user, which usefully could be on the order of 15 seconds. The solenoid 128, under control of the security control 124, remains powered for the set time duration, even if the system 100 enters standby mode or is shut down.

It will be seen that by providing the security control 124, the solenoid 128, and the lock release program installed to run on a portable computer, mechanical movement of element 130 can be generated by simply entering the password. As described hereinafter in connection with FIGS. 5-14, the solenoid element with rotor or plunger 130 is coupled to vary a slot dimension for a conventional USS locking device, used to secure the computer to a docking station or other stationary structure. More particularly, energization of solenoid 128 moves rotor or plunger 130 to change or expand dimensions of the slot used to receive and retain the locking element of the USS device. The locking element may then be removed from the slot, to unlock or release the portable computer, even though the USS locking device remains in a locked condition.

This removal action must be taken during the specified time period, or the solenoid rotor or plunger 130 will return to its de-energized position. Moreover, the means for unlocking the conventional USS device, such as a manual key or combination lock dial, can still be operated by a user to release the portable computer. It is thus seen that embodiments of the invention do not require any changes or modifications to a conventional USS locking device used therewith.

Figure 2:
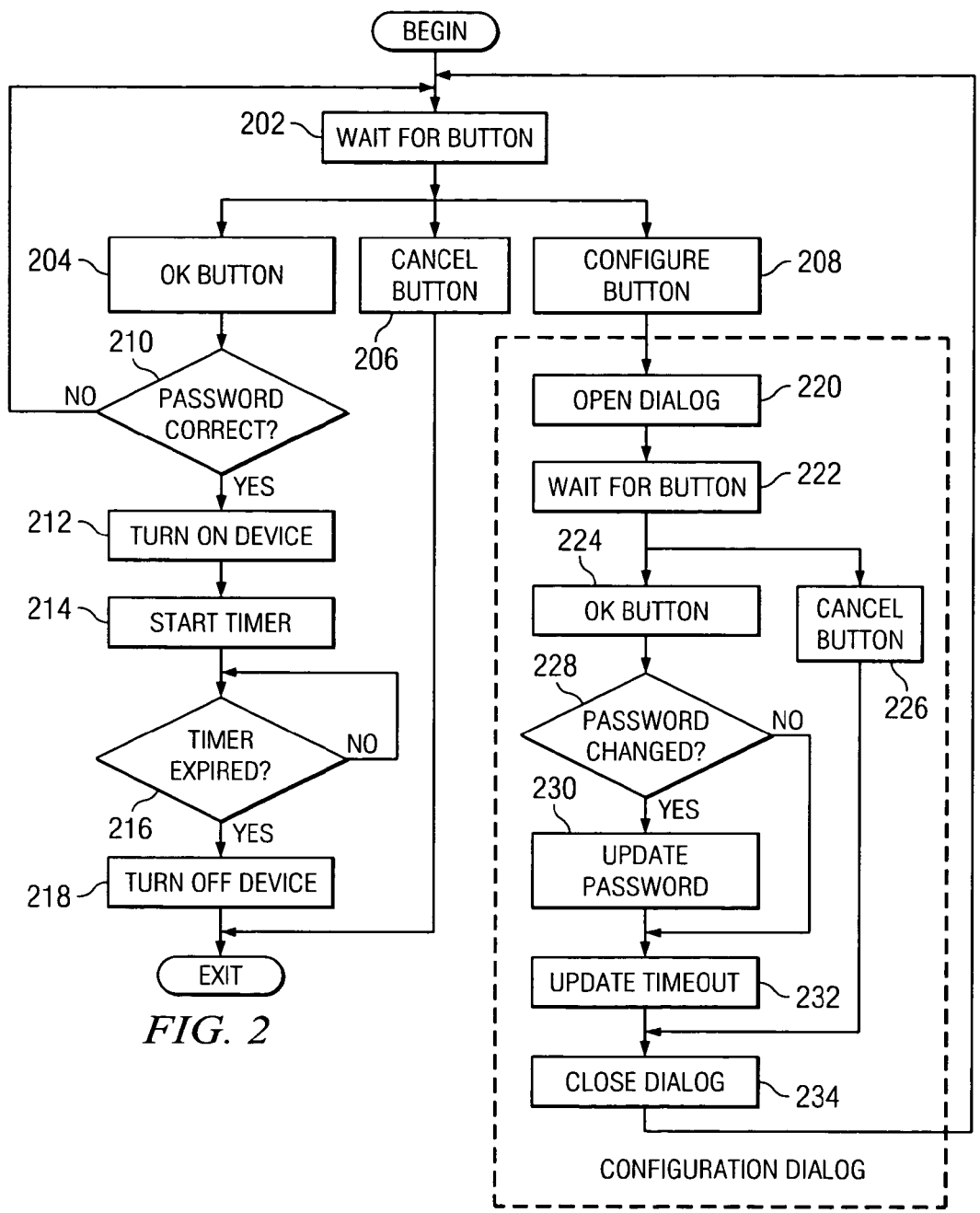
FIG. 2 is a flow chart depicting tasks or steps carried out by a program running on the computer of FIG. 1, in implementing an embodiment of the invention.

Referring to FIG. 2, there is shown a flow chart illustrating respective steps taken by a user in interacting with a lock release program as described above, when such program is running on system 100 to control operation of solenoid 128. After beginning a program sequence to unlock the portable computer security device, the program causes virtual buttons to appear on the computer monitor or other user interface. The program then waits for the user to select one of the virtual buttons as shown by function block 202. Function blocks 204-206 indicate that three different buttons may be selected for directing the lock release program to perform one of three sequences. Selecting the OK button, as indicated by function block 204, commences a sequence to energize solenoid 128 as described above. Selecting the Cancel button results in immediately exiting the program, as shown by function block 206. Function block 208 indicates that selection of Configure button 208 commences a configuration dialogue sequence, as described hereinafter.

Figure 3A:
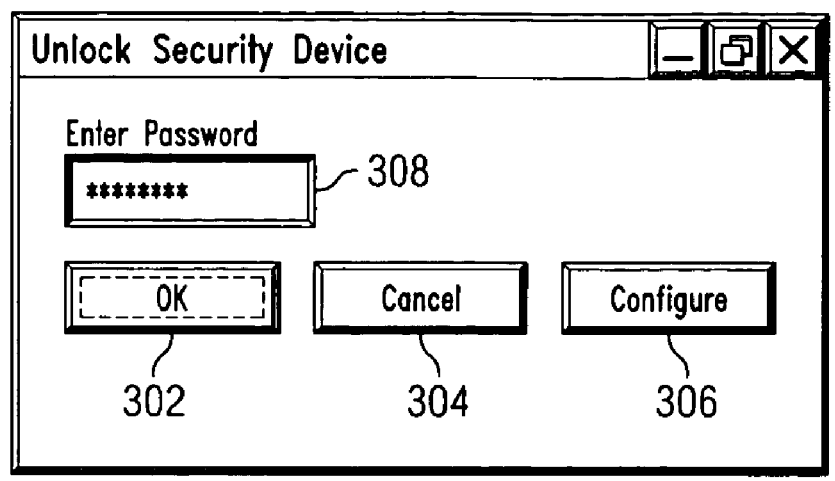
FIGS. 3A and 3B depict information presented to a user in connection with certain steps shown in FIG. 2.

Referring to FIG. 3A, the three buttons associated with function blocks 204-208 are respectively represented as they appear to a user on a computer viewing screen. Thus, FIG. 3A depicts OK button 302 and the locations 304 and 306 of the Cancel and Configure buttons, respectively. FIG. 3A further shows a window 308 wherein the password is to be entered to energize the solenoid 128. After the password has been inserted into window 308, the OK button is operated to commence a lock release sequence. As is the case in most computer programs, keyboard keys may be used to provide an alternate user input means for button operation.

Referring further to FIG. 2, decision block 210 indicates that after the lock release sequence has been started, the program determines whether or not the password is correct. If not, the sequence returns to its beginning at function block 202. The screen shown in FIG. 3A will then reappear, to allow the user to enter the correct password. However, if the initial password is found to be correct at decision block 210, a signal is generated to energize the solenoid 128 or other linear or rotary actuator, as described above. This is shown by function block 212. Thereupon a timer is started, as indicated by function block 214, to limit energization to the specified time period. Expiration of the time period is continually monitored, as shown by decision block 216. Device 128 is de-energized or turned off when the period expires, as shown by function block 218, and the sequence comes to an end. Blocks 216 and 218 may be implemented by the control program or security control element or both in implementation variations of this invention.

Figure 3B:
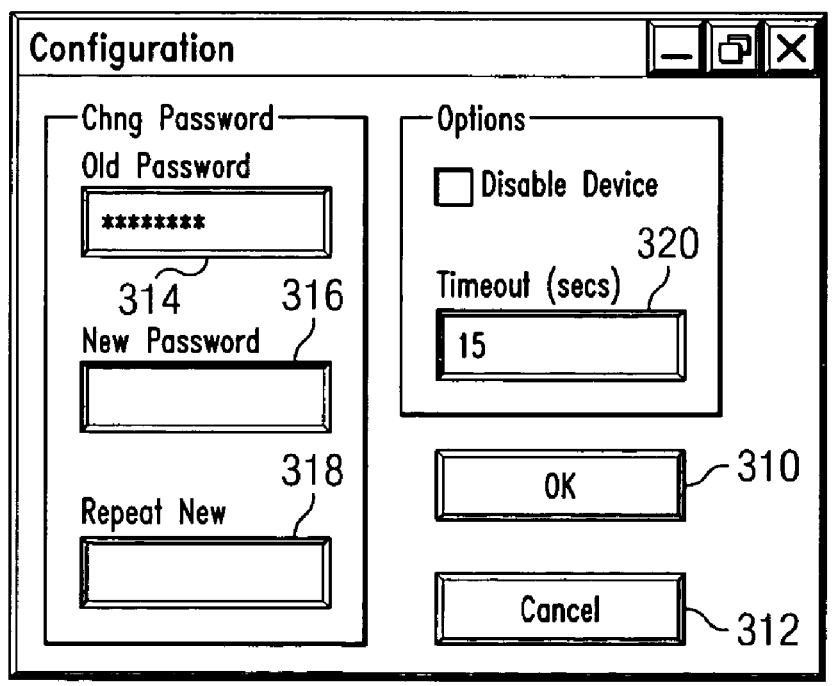

Referring again to FIG. 2, function block 220 indicates that a configuration dialogue is opened, when the configure button is selected. This will enable a user to change the password or the time-out time, that is, the time that the solenoid is energized. After opening the configuration dialogue, the program causes virtual buttons pertaining to this sequence to appear on the viewing screen, as shown by function block 222. The program then waits for the user to select one of the virtual buttons so presented. FIG. 3B indicates that both OK and Cancel buttons may be displayed allowing user selection at locations 310 and 312, respectively. This is also shown by function blocks 224 and 226 of FIG. 2. If the Cancel button is selected, the configuration dialog is closed. If the OK button is selected, decision block 228 of FIG. 2 indicates that the software program determines whether or not the password is to be changed.

Referring further to FIG. 3B, there are shown windows 314-318, for respectively displaying the old password and entering and confirming a new password. Thus, if the password is to be changed or updated, the user carries out this task, represented in FIG. 2 by function block 230, by entering the new password in both windows 316 and 318.

FIG. 2 further shows a function block 232 following decision block 228, wherein function block 232 pertains to updating the time out or time period of solenoid energization. Such time-out may be readily changed, by entering the new period at window 320, shown in FIG. 3B. Thereafter, the configuration dialogue is closed, as indicated by function block 234.

Figure 4:
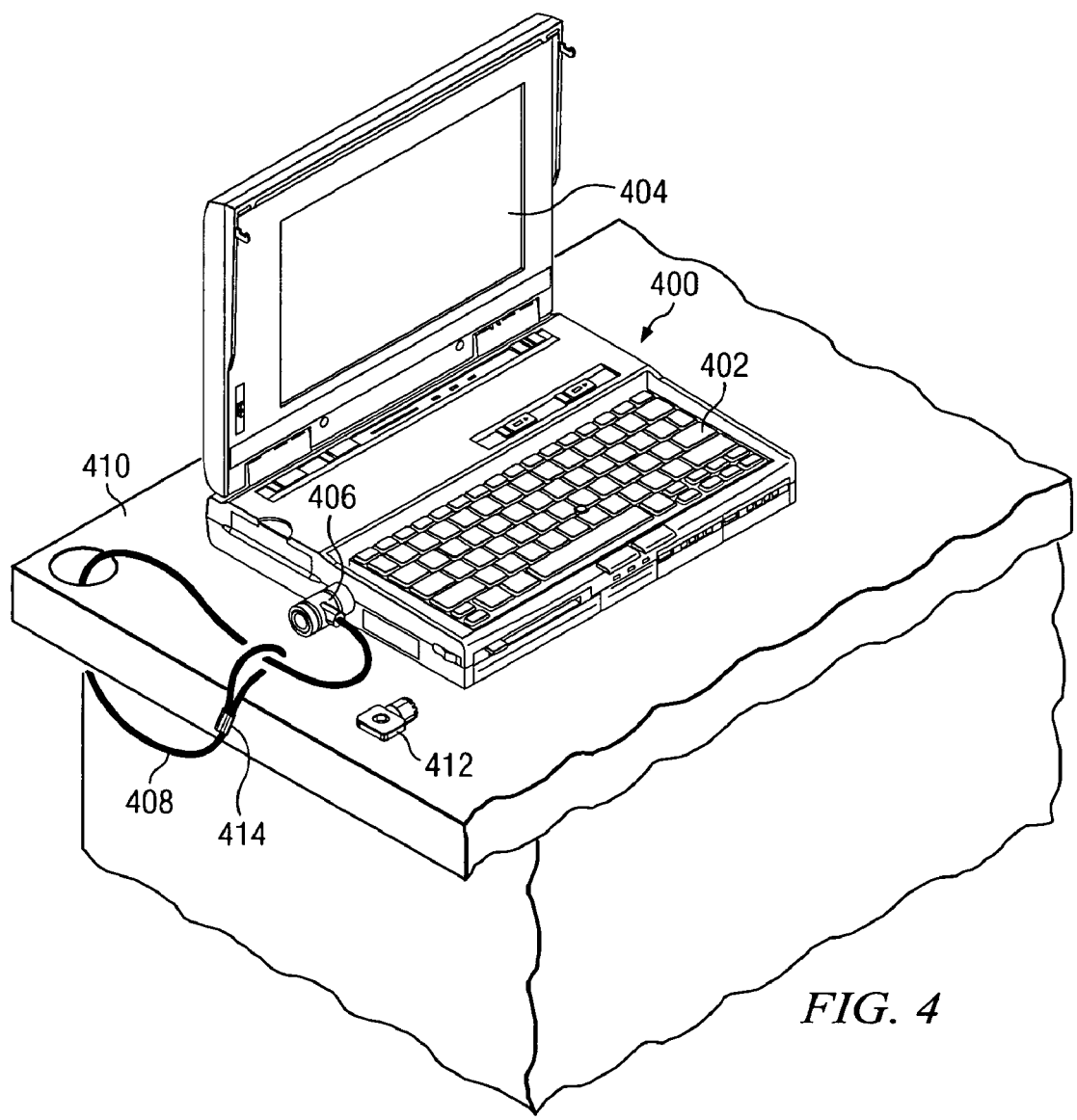
FIG. 4 is a perspective view showing a portable computer for containing the data processing system and solenoid of FIG. 1.

Referring to FIG. 4, there is shown a laptop or other portable computer 400, configured to contain respective components shown in FIG. 1 including data processing system 100, security control 124, solenoid driver 126 and solenoid 128 with its plunger 130. Portable computer 400 is provided with a keyboard 402 and monitor 404 for use by a computer user or operator. FIG. 4 also shows a locking mechanism 406, comprising a conventional USS locking device. Locking mechanism 406 is inserted into a USS compatible slot formed in portable computer 400 (not shown in FIG. 4) and is thus releasably locked to the computer.

FIG. 4 further shows one end of a flexible steel cable 408 firmly attached to locking mechanism 406. An eye is formed in the other end of cable 408, by means of a steel sleeve 414. Accordingly, cable 408 can be looped through a hole or aperture formed through stationary structure 410, as shown in FIG. 4, in order to secure portable computer 400 to the structure 410. Computer 400 thus cannot be removed from the location shown in FIG. 4, without either cutting cable 408 or removing locking mechanism 406 from the computer. FIG. 4 shows a key 412 that can be used to manually unlock the mechanism 406, in conventional manner, so that it can be removed. Alternatively, the solenoid 128 may be energized as described above, to expand the slot that holds locking mechanism 406. The locking mechanism 406 may then be removed from engagement with computer 400. Operation of the solenoid to expand the slot, in accordance with embodiments of the invention, is described hereinafter in further detail in connection with FIGS. 5-12.

Figure 5:
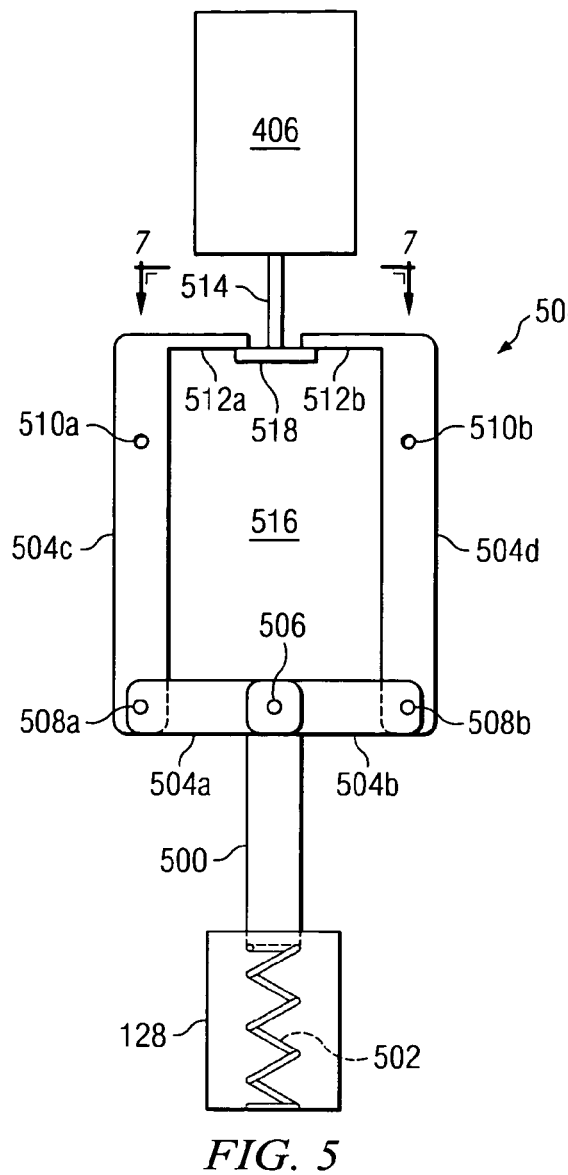
FIGS. 5 and 6 are views showing a USS locking device and compatible slot for the computer of FIG. 4, and further showing the solenoid of FIG. 1 adjusting a mechanical component located at the slot entrance to hold and release positions, respectively.

Referring to FIG. 5, there is shown solenoid 128 and a plunger 500 in a de-energized mode, wherein the plunger is constrained to move linearly. There is further shown a spring 502 in a relaxed or unstressed condition. Spring 502 is joined to plunger 500 to receive forces therefrom and apply forces thereto, along the direction of plunger movement. It will be readily apparent that spring 502 will always act to return and maintain plunger 500 in the position shown in FIG. 5, in the absence of any counter forces.

FIG. 5 further shows an end of plunger 500 attached to an adjustable mechanical component 504 by means of a pivotable pin 506. Component 504 comprises elongated links 504*a* and 504*b*, each having one end joined to plunger 130 by pin 506. The opposing ends of links 504*a* and *b* are respectively joined to ends of arms 504*c* and 504*d*, by pivotable pins 508*a* and 508*b*. Arms 504*c* and *d* are restrained to pivot about pivot points 510*a* and 510*b*, respectively. Arms 504*c* and *d* are also respectively provided with slot edge members 512*a* and 512*b*, wherein the spacing between the two slot edge members is selectively adjusted by pivoting arms 504*c* and 504*d*.

Figure 7:
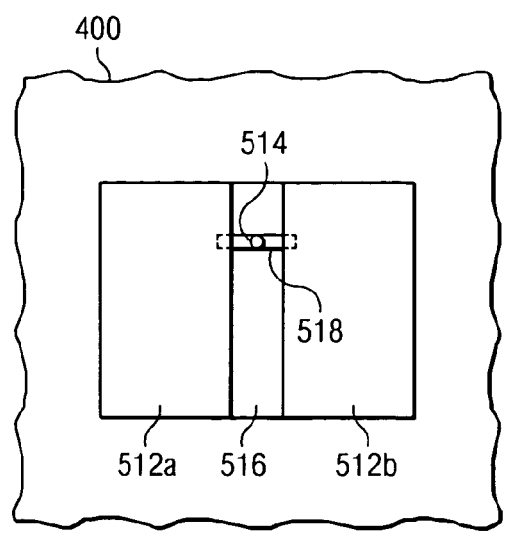
FIGS. 7 and 8 show views taken along lines 7-7 of FIG. 5 and along lines 8-8 of FIG. 6, respectively, in relation to the computer of FIG. 4.

Referring further to FIG. 5, there is shown USS locking device 406 provided with a rotatable shaft 514, and with a locking tab or locking element 518. FIG. 5 shows the shaft 514 and locking element 518 extending downward into a slot 516. It will be readily apparent that the width of the entrance to the slot, wherein the slot entrance is adjacent to locking device 406, is determined by the spacing between slot edge members 512*a* and 512*b*. FIG. 5 and FIG. 7 together show that locking element 518 is elongated, and has a length greater than the spacing between edge members 512*a* and *b* that is shown in FIGS. 5 and 7. Thus, when locking element 518 and arms 504*c* and *d* of component 504 are respectively positioned as shown in FIG. 5, locking mechanism 406 cannot be removed from slot 516. In a preferred embodiment, the spacing between the slot edge members 512*a* and *b* shown in FIGS. 5 and 7 is equal to the width of the entrance to a USS compatible slot.

Referring further to FIG. 7, it will be seen that if shaft 514 and locking element 518 are rotated by 90 degrees, locking element 518 can readily be removed from slot 516. The shaft and locking element can be rotated, simply by unlocking the locking mechanism 406 using conventional manual means, such as key 412.

Figure 6:
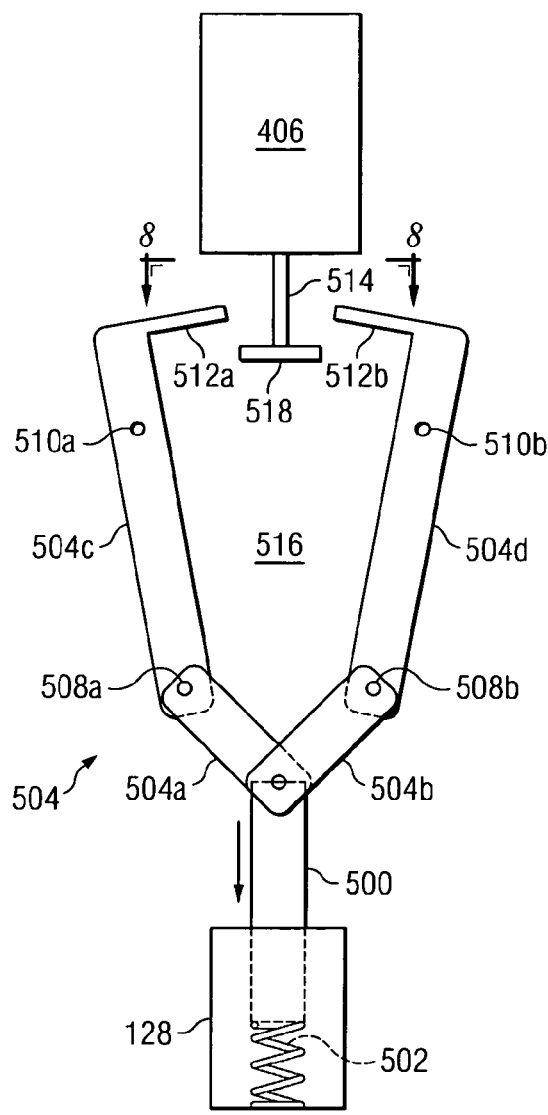
Figure 8:
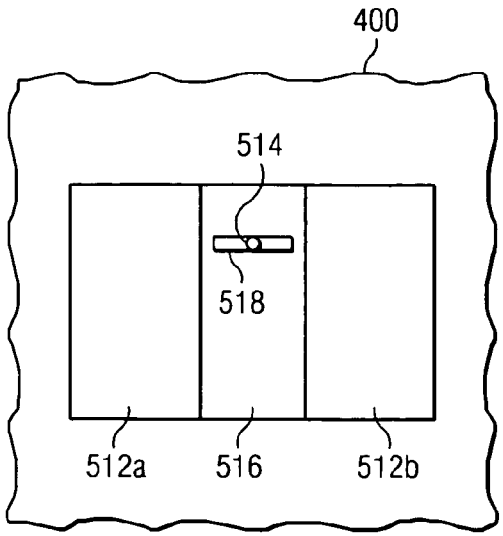

Referring to FIGS. 6 and 8 together, there is shown solenoid 128 energized, whereby plunger 500 is moved downward as viewed in FIG. 6. This action pivots arms 504*c* and *d* of structure 504 to increase the spacing between slot edge members 512*a* and 512*b*. The increased spacing is large enough to allow locking element 518 to be withdrawn from slot 516, even though locking mechanism 406 remains locked, and locking element 518 remains oriented as shown in FIGS. 6 and 8. Thus, energizing solenoid 128 enables locking mechanism 406 to be released from computer 400, even though locking mechanism 406 itself remains in a locked mode. Moreover, FIG. 6 shows spring 502 compressed as solenoid 128 is energized and the plunger 500 is moved. Accordingly, when solenoid 128 is de-energized, spring 502 will act to restore plunger 500 and component 504 to their normal positions or configurations, that is, to those shown in FIG. 5.

Figure 9:
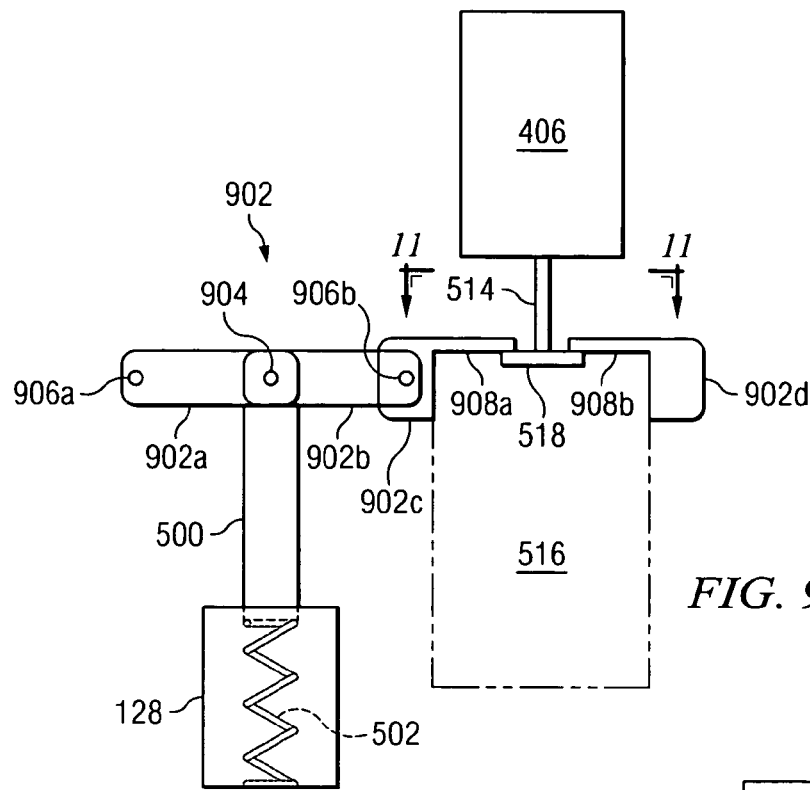
FIGS. 9 and 10 are views showing the device, slot and solenoid of FIGS. 5 and 6, and further showing another embodiment of the mechanical component, adjusted to hold and release positions, respectively.

Referring to FIG. 9, there is shown solenoid 128 in a de-energized state, together with plunger 500 and spring 502, as described above. FIG. 9 further shows the end of plunger 500 attached to an adjustable mechanical component 902 by means of a pivotable pin 904. Component 902 comprises elongated links 902*a* and 902*b*, each having one end joined to plunger 500 by means of pin 904. The opposing end of link 902*a* is constrained to pivot about a pin 906*a*, and the opposing end of link 902*b* is joined to a sliding sub-component 902*c*, by means of a pivotable pin 906*b*. Component 902 further comprises a fixed or anchored sub-component 902*d*, and sub-components 902*c* and *d* are provided with slot edge members 908*a* and 908*b*, respectively. Sub-Component 908*a* is constrained by conventional means, not shown, to sliding or translational movements toward or away from anchored sub-component 902*d*. Thus, the spacing between slot edge members 908*a* and 908*b* is adjustable by moving sub-component 902*c* to the right or left, as viewed in FIG. 9.

Figure 11:
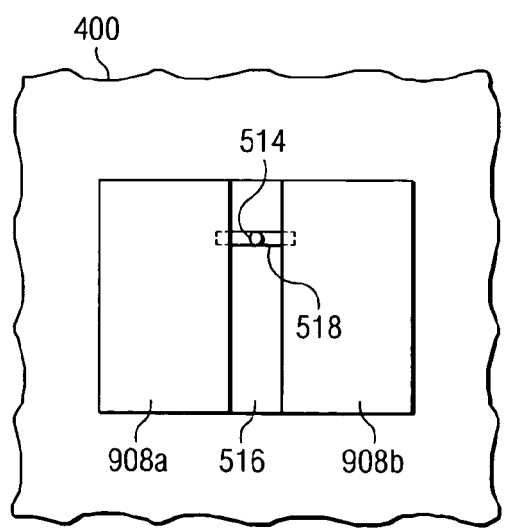
FIGS. 11 and 12 show views taken along lines 11-11 of FIG. 9 and lines 12-12 of FIG. 10, respectively, in relation to the computer of FIG. 4.

Referring to FIGS. 9 and 11 together, there are shown slot edge members 908*a* and *b* spaced apart to provide a width for the entrance to slot 516 that is compatible with a USS slot width. Accordingly, locking element 518 of locking mechanism 406 is retained in slot 516 by mechanical component 902, when solenoid 128 is de-energized. The action of component 902, with respect to solenoid 128 and locking mechanism 406, is thus similar to the action of component 504, described above.

Figure 10:
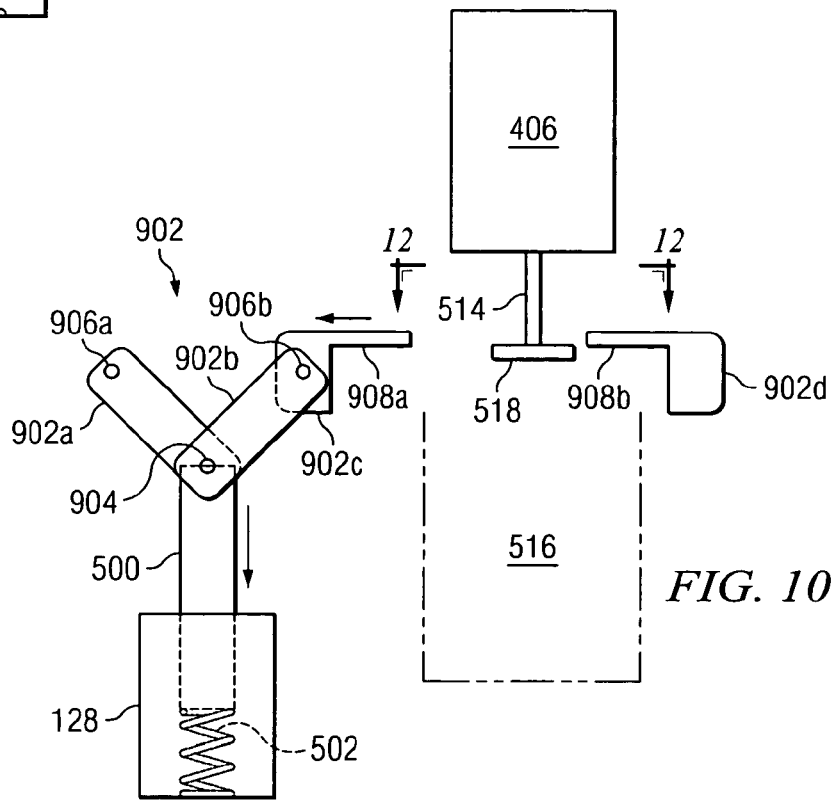

Referring to FIG. 10, there is shown solenoid 128 energized, whereby plunger 500 is moved downward and sliding sub-component 902c is moved to the left, as viewed in FIG. 10. Thus, the spacing between slot edge members 908a and b becomes large enough for locking element 518 and mechanism 406 to be withdrawn from slot 516. When solenoid 128 is de-energized, spring 502 will act to return plunger 130 and component 902 to the configuration shown by FIG. 9.

Figure 13:
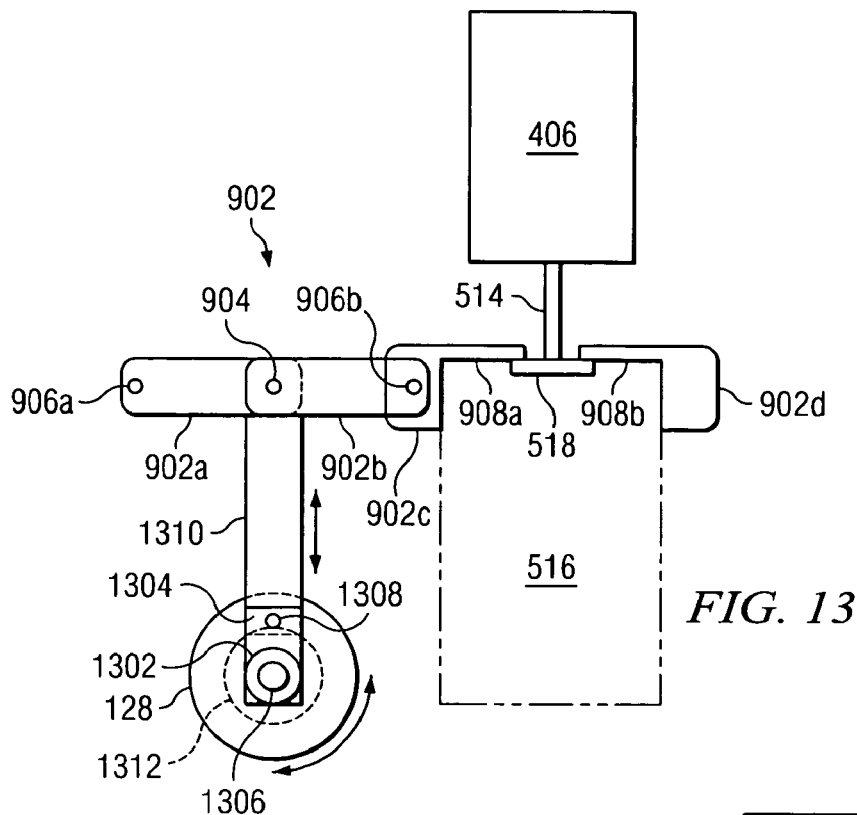
FIGS. 13 and 14 are views showing the locking device, slot and mechanical component of FIGS. 9 through 12, wherein the mechanical component is adjusted to hold and release positions by a solenoid having a rotary, rather than a linear, actuator.
Figure 14:
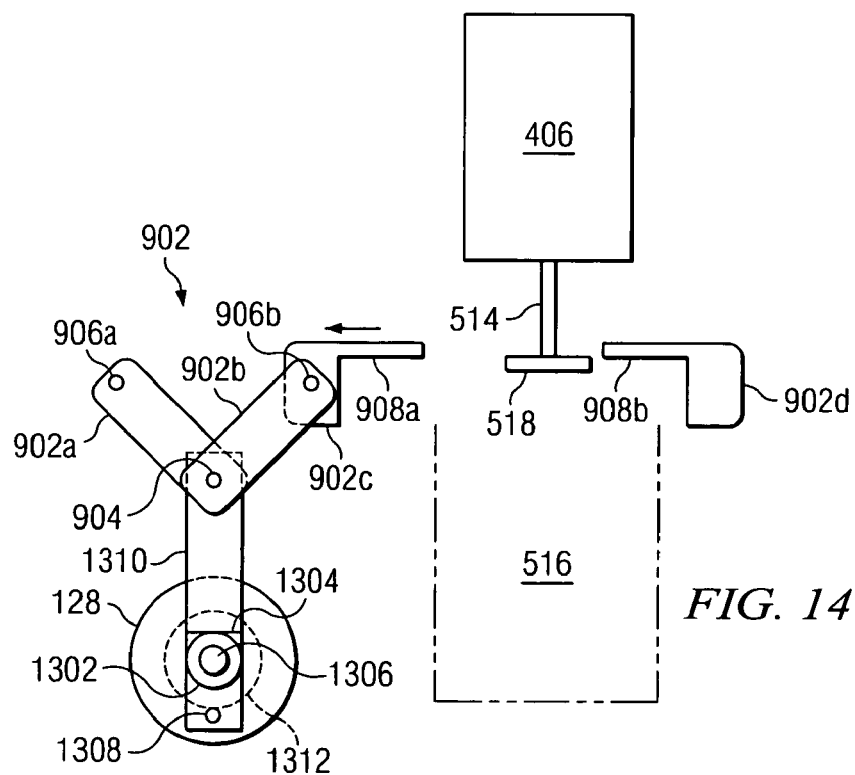

Referring to FIGS. 13 and 14, there is shown a rotor or rotary actuator 1302 for solenoid 128, wherein solenoid 128 is configured to provide rotary movement to rotor 1302, rather than linear movement to a plunger 500 as described above. More particularly, rotor 1302 is rotated through 180 degrees by solenoid 128, whenever the solenoid is energized or de-energized, respectively.

FIG. 13 shows rotor 1302 at its position when solenoid 128 is de-energized, and FIG. 14 shows rotor 1302 at its energized position.

Referring further to FIGS. 13 and 14, there is shown a short link 1304 having an end fixably joined to rotor 1302, by means of a pin 1306. Accordingly, the short link 1304 rotates with rotor 1302. The other end of short link 1304 is joined to an end of a link 1310, by means of a pivotable pin 1308. Accordingly, link 1310 reciprocates, or moves upwardly and downwardly as viewed in FIGS. 13 and 14, as rotor 1302 is rotated between its energized and de-energized positions.

A spring 1312 joined to rotor 1302 is in a relaxed or unstressed condition, when rotor 1302 is in its de-energized position as shown in FIG. 13. Thus, spring 1312 will store force when solenoid 128 is energized to move rotor 1302 and link 1310 to the positions thereof shown in FIG. 14. Thereafter, when the solenoid is de-energized, spring 1312 will return rotor 1302 and link 1310 to their respective de-energized positions, shown in FIG. 13.

Figure 12:
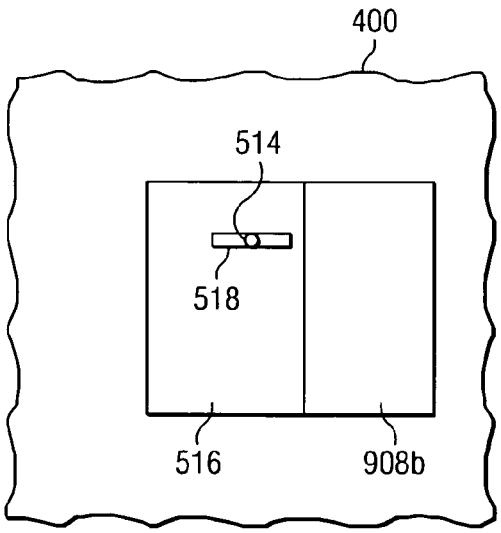

FIGS. 13 and 14 further show the opposite end of link 1310 coupled to adjustable mechanical component 902, by means of the pin 904. Locking mechanism 406, with its locking element 518 and shaft 514, is arranged in relation to mechanical component 902 in like manner with the arrangement thereof shown in FIGS. 9-12. Accordingly, when rotor 1302 is in its de-energized position, locking element 518 of locking mechanism 406 is retained in slot 516 by mechanical component 902, as best shown by FIGS. 13 and 11. When the solenoid is energized, rotor 1302 is rotated to move link 1310 downward, and to move sliding sub-component 902c to the left, as viewed in FIG. 14. Thus, the spacing between slot edge members 908a and b becomes large enough for locking element 518 and mechanism 406 to be withdrawn from slot 516, as shown in FIGS. 14 and 12. When solenoid 128 is de-energized, spring 1312 will act to rotate rotor 1302 back to its de-energized position.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In a portable computer, security apparatus comprising:
a locking mechanism having a user interface and a locking element, wherein said locking element is movable from a lock mode to an unlock mode in response to operation of said user interface;
a slot adjust component joined to said portable computer proximate to a slot disposed to receive said locking element, said component being selectively adjustable to hold and release configurations, said received locking element being fixably retained in said slot when said locking element is in said lock mode and said component is adjusted to said hold configuration; and
a device actuatable in response to a command generated by a specified program running on said computer to adjust said component from said hold configuration to said release configuration, wherein said actuatable device is movable between first and second positions to adjust said component between said hold and release configurations, respectively, wherein said actuatable device is moved to said second position only for a specified time interval, and is thereafter moved back to said first position, wherein said slot adjust component is positioned proximate to the entrance to said slot and comprises a mechanism responsive to movements of said actuatable device to vary at least one dimension of said slot entrance between hold and release configurations.

2. The apparatus of claim 1, wherein:
said actuatable device comprises a solenoid having a plunger that is movable between first and second positions to adjust said component between said hold and release configurations, respectively.

3. The apparatus of claim 2, wherein:
said slot adjust component is positioned proximate to the entrance to said slot, and comprises a mechanism responsive to movements of said plunger to vary at least one dimension of said slot entrance between hold and release configurations.

4. The apparatus of claim 3, wherein:
said plunger is moved by said solenoid to said second position only for a specified time interval, and is thereafter moved back to said first position.

5. The apparatus of claim 1, wherein:
said actuatable device comprises a solenoid having a rotor that is rotatable between first and second positions to adjust said component between said hold and release configurations, respectively.

6. The apparatus of claim 5, wherein:
said slot adjust component is positioned proximate to the entrance to said slot, and comprises a mechanism responsive to rotations of said rotor to vary at least one dimension of said slot entrance between hold and release configurations.

7. The apparatus of claim 6, wherein:
said rotor is rotated by said solenoid to said second position only for a specified time interval, and is thereafter rotated back to said first position.

8. The apparatus of claim 1, wherein:
said user interface of said locking mechanism is adapted to be manually unlocked by a user, to enable said locking element to be moved from said lock mode to said unlock mode.

9. The apparatus of claim 1, wherein:
said command generated by said specified program is enabled by a specified password entered by a user of said computer.

10. The apparatus of claim 1, wherein:
said command generated by said specified program is enabled by a signal from a biometric sensor that positively identifies a user of said computer.

11. The apparatus of claim 1, wherein:
said locking device is adapted to be unlocked by manual operation of an insertable key or by manual operation of a combination lock, selectively.

12. In a portable computer having a slot disposed to receive the locking element of a locking mechanism, wherein the locking element is movable between lock and unlock modes by operation of a manual user interface, a method comprising the steps of:
generating a signal confirming that a user engaged in operating said portable computer is authorized to do so;
running a specified program on said portable computer to generate a release command;
actuating a device to vary at least one dimension of the entrance to said slot in response to said release command, wherein said actuatable device is movable between first and second positions to adjust a slot adjust component between a hold and a release configurations, respectively, wherein said actuatable device is moved to said second position only for a specified time interval, and is thereafter moved back to said first position, wherein said slot adjust component is positioned proximate to the entrance to said slot and comprises a mechanism responsive to movements of said actuatable device to vary at least one dimension of said slot entrance between hold and release configurations; and
removing said locking element from said slot while said locking element remains in its lock mode.

13. The method of claim 12, wherein:
said locking element must be removed from said slot within a specified time period following generation of said release command.

14. The method of claim 12, wherein:
said actuating step comprises energizing a solenoid contained in said computer to reconfigure said component located proximate to said slot entrance from a hold configuration to a release configuration.

15. The method of claim 14, wherein:
said release command generated by said specified program is enabled by a specified password entered by a user of said computer.

16. The method of claim 15, wherein:
said specified program is operable to enable a user to change said specified password and said specified time period, selectively.

17. The method of claim 16, wherein:
said locking mechanism comprises a Universal Security Slot locking device, and is adapted to be unlocked by manual operation of an insertable key or by manual operation of a combination lock, selectively.

18. In a portable computer having a computer readable medium and a slot disposed to receive the locking element of a locking mechanism, wherein the locking element is movable between lock and unlock modes by operation of a manual user interface, a computer program product in said computer readable medium comprising:
first instructions for generating a signal confirming that a user engaged in operating said portable computer is authorized to do so;
second instructions for running a specified program on said portable computer to generate a release command; and
third instructions for actuating a device to vary at least one dimension of the entrance to said slot in response to said release command, wherein said actuatable device is movable between first and second positions to adjust a slot adjust component between a hold and a release configurations, respectively, wherein said actuatable device is moved to said second position only for a specified time interval, and is thereafter moved back to said first position, wherein said slot adjust component is positioned proximate to the entrance to said slot and comprises a mechanism responsive to movements of said actuatable device to vary at least one dimension of said slot entrance between hold and release configurations, and
said variation of said slot dimension enabling said locking element to be removed from said slot while said locking element remains in its lock mode.

19. The computer program product of claim 16, wherein:
said actuation comprises energizing a solenoid contained in said computer to reconfigure said component located proximate to said slot entrance from a hold configuration to a release configuration.

20. The security apparatus of claim 1, further comprising:
the actuatable device, wherein the actuatable device remains in the second position only for the specified time interval, even if the system enters standby mode or is shut down during the specified time interval.

* * * * *